9152X
J. Goulding.
Machine for Laying Rope.
No. NO PRINTED COPY OF SPECIFICATION IN OFFICE. Patented Oct. 10, 1835.
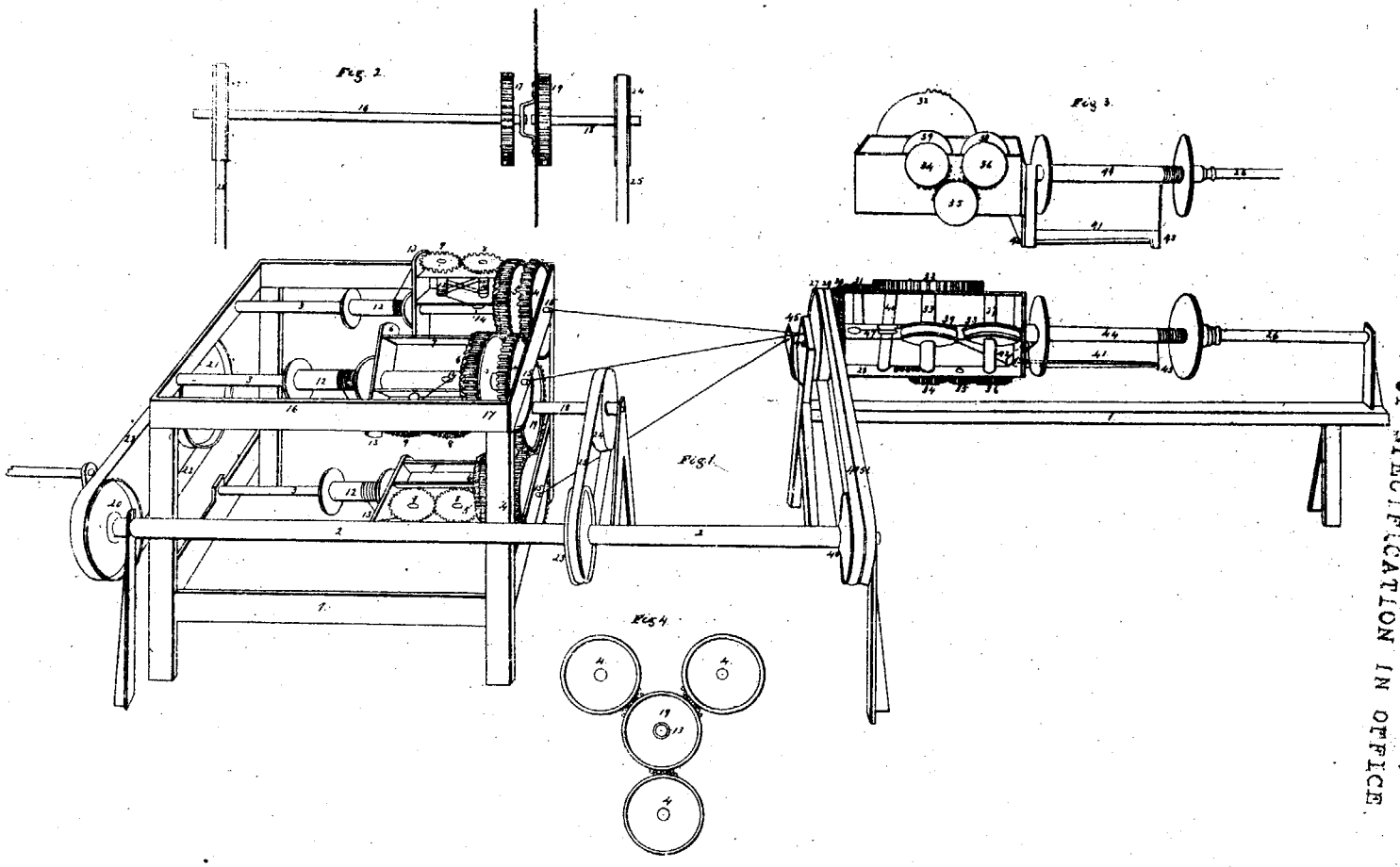

9152X  Oct. 10. 1835  224.

John Goulding, of Boston, Mss:
Letters Patent

The schedule referred to in these Letters Patent and making part of the same, containing a description in the words of the said John Goulding himself. of his improvement in the machine for laying ropes –

---

Be it known that I John Goulding of Boston, in the County of Suffolk & Commonwealth of Massachusetts machinist have invented a new & useful machine for laying ropes, & that the following is a full and exact description of the construction & operation of said machine as invented by me, see the drawings hereto annexed. Fig. 1. 1. in this figure is the frame of the machine. 2. is the main shaft, 3.3.3. are shafts or spindles. 4.4.4. are spur gears fixed to the spindles 3.3.3 – 5.5.5. are spur gears through which the spindles 3.3.3. run but to which they are not attached. 6.6.6. are bevel gears firmly attached to the spur gears 5.5.5. and playing into the bevel gears. 8.8.8. 7.7.7. are small frames fastened to the spindles 3.3.3. and turning with it 8.8.8. are bevel gears turned by the bevel gears 6.6.6. the wheels 9.9.9. are turned by 8.8.8. the teeth of one playing into the teeth of the other. The wheels 8 & 9 are fastened to the end of the creased rollers 10 & 11. & turn them. These rollers are at right angles with the spindles 3.3.3. 12.12.12. are bobbins upon the spindles 3.3.3. – 13.13.13. are holes made through a projecting side of the frames 7.7.7. through which the strans or ready are drawn. 14.14.14. are holes in the sides of the spindles 3.3.3. which from that place to the ends 15.15.15. are tubes. 16 is a shaft one end of which is in the frame near the pulley 21. & the other end has a rest near the spur gear 17 – 17 is a spur gear on the shaft 16 – 17. plays into the loose spur gears 5.5.5. and regulates their motions upon the spindles 3.3.3. – 18 is a short shaft in a direct line with the shaft 16 – 19. is a spur gear in the shaft 18. which plays into the gears 4.4.4. 20 is a pulley on the main shaft 2. 21. is a pulley on the shaft 16 – 22 is a band connecting them. 23 is also a pulley on the main shaft 2 – 24 is a pulley on the short shaft 18 – 25. is a band connecting them – 26 is a shaft in the finishing part of the frame 1. – 27. is a pulley made fast to the shaft 26. & used to turn it, 28 is a small frame made fast to [illegible] shaft [illegible] 26 & turning with it – 29 is a pulley playing loose on shaft 26 - 30 is a bevil gear attached firmly to 29.
31. is a bevil gear, into which 30 plays - This is a stud - 32 is a wheel turned
by the stud 31. & is attached to one end of the roller shaft 33. - 34 is at the
other end of the roller shaft & the other side of the frame 28 - 34 turns a stud
35 which turns a wheel 36. This wheel is on the end of the roller shaft 37 -
38 & 39 - are friction rollers on the shafts 33 & 37. These rollers are grooved - 40
is another friction roller which is held by a spring or otherwise close up to
the grooves in 39. 41 is a fly or arm attached to the frame 28. & shaft 26. - 42
is a pulley at the angle of the arm 41 - 43 is another pulley at the end of the
same arm - 44 is a bobbin on the shaft 26 - 45 is a guide for the strans that
are to compose the rope, 46 is a hole in the end of the shaft 26. This shaft is
a tube as far as 47 - which is a hole at the other end of the tubular part -
48. is a pulley on the main shaft 2 - 49 - is a band connecting the pullies 48 & 27.
50. is another pulley on the main shaft. 51. is a band connecting the pullies 50 &
29 - Those parts of the machine which could not be so distinctly represented in
fig. 1. are more clearly exhibited in figures - 2. 3 & 4. of the drawings -
The numbers will show of what parts of the machine they are duplicates - The above
is a description of a machine to make a rope of three strans. If more than
three strans are to be laid into a rope there must be so many more spindles
like 333. because each one of those spindles twists one stran only. To operate
this machine the bobbins 12.12.12. being filled with a stran, or what rope
makers call a ready, are put into the spindles 3.3.3. The end of the stran
or ready is drawn thro' the hole 13. in the projecting side of the small
frame 7. & is then carried backwards & forwards over the creased rollers 11 & 10.
(crossing between the rollers, as they move different ways) a sufficient number
of times to give the stran the requisite tension so that it will not draw for-
ward from the bobbin too easily. The stran is then carried into the hole 14.
in the spindle & comes out at the end 15. From 15.15.15. the strans are carried
forward to the guide 45, which has as many holes as there are strans to be
laid into the rope. a grooved or fluted top may be used instead of the
above described guide. The strans now being twisted together pass into hole
46. come out at 47. pass between the rollers 40, and 39. round 39 & 38. a suf-
ficient number of times to give the requisite tension (which varies with the pleability of the stock the number & size of the strans &c.) and is then carried over the pullies 42 & 43 & wound up on the bobbin 44. to which a backward & forward motion is given on the shaft 26, so that it may be evenly wound. Now 24 being a pulley on the short shaft 18 is turned by turning the main shaft 2 & 19. being a spur gear on the same shaft is turned also. The spur gear 19 plays into the three spur gears 4.4.4. on the spindles 3.3.3. which are consequently turned by the same motion, & the frames 7.7.7. are also carried round. This rotatory motion of the frames twists the strans. The strans are drawn off from the bobbins as follows. The spur gear 17. which is fastened to the shaft 16. plays into the gears 5.5.5. each of which has a bevil 6. firmly attached to it. 6 turns 8, turns 9. 8 & 9. being attached to the end of the creased rollers 10 & 11. they of course are also turned. Thus a double rotatory motion is given to 8 & 9. The shaft 16 is turned by the pulley 21. 21. is smaller than the pulley 24 & hence the gear 17. together with 6.6.6. & 5.5.5. (which last are loose upon the spindles 3.3.3.) are turned a little faster than the gears 4.4.4. In consequence of this faster motion of 5.5.5. & 6.6.6. the bevil gears 8.8.8. are turned upon their own axis at the same time that they are ~~now~~ revolving with the spindles 3.3.3. This draws the strans of the bobbins 12.12.12. and the rotatory motion of the frames 7.7.7. twists them. They now pass through the guide 45. where they are united & an opposite twist is given them by the rotatory motion of the frame 28. The pulley 29. which is carried by means of the band 51. is loose upon the shaft 26. & being a little smaller than pulley 27. is carried round faster. Hence the bevil gear 30. which is fastened to ~~[illegible]~~ 29 turns the slid 31. as it is revolving round with the frame 28. This communicates a motion to 32. 33. 34. 35. 36. 37. 38 & 39. moving the rope along over the rollers 39 & 38. whence it is at last taken over the pullies 42 & 43. and wound up on the bobbin 44. This bobbin may be carried by extending the main shaft 2. & fastening a pulley upon it to be connected with the bobbin or by separate machinery making the bobbin go a little faster than the shaft 26. or by putting friction upon it & causing it to move slower than the shaft —

Instead of the bands and pullies, gears may be used & should be for large work. It is obvious that the parts of the machine for unwinding the strans & for twisting the strans & the rope, & also for winding up the latter must have a certain relation or adaptedness to each other according to the work done. The bobbin 44. for instance can never take up quite so fast as the bobbins 12. 12.12. give off. The reduction of the length by twisting will be the difference & this will vary according to the quantity of twist put into the rope.

If but little twist is to be put into the rope let the pully 21 be smaller compared with 19. If much twist is required let 21 & 19. be nearer of a size. In the same way the after turn may be regulated by the relative size of the pully 27. and made to correspond with the fore turn. But the number of these modifications in manufacturing different kinds of stock into different kinds of goods is indefinite, & from their nature do not admit of precise specification.

What I claim as my invention & for which I herein claim Letters patent is the combination & arrangement of those parts of the above described machine by which the strans & the rope are twisted & drawn forward so that they may be wound up on the bobbin marked 44. or otherwise disposed of.

Witnesses
John G. McKean
Horace Mann

John Goulding

Exd [illegible]
[illegible]

2000 words (Patented October 10. 1835)

(Drawing)